US012758919B2

(12) United States Patent
Park

(10) Patent No.: US 12,758,919 B2
(45) Date of Patent: Oct. 13, 2026

(54) FILTER MODULE HAVING POST-TREATMENT FILTRATION FUNCTION

(71) Applicant: KORTECH KOREA CO., LTD., Daegu (KR)

(72) Inventor: Je Sung Park, Daegu (KR)

(73) Assignee: KORTECH KOREA CO., LTD., Daegu (KR)

( * ) Notice: Subject to any disclaimer, the term of this patent is extended or adjusted under 35 U.S.C. 154(b) by 398 days.

(21) Appl. No.: 18/498,736

(22) Filed: Oct. 31, 2023

(65) Prior Publication Data

US 2024/0207787 A1 Jun. 27, 2024

(30) Foreign Application Priority Data

Dec. 22, 2022 (KR) ........................ 10-2022-0181934

(51) Int. Cl.
*B01D 61/10* (2006.01)
*B01D 35/30* (2006.01)
(Continued)

(52) U.S. Cl.
CPC ........... *B01D 61/10* (2013.01); *B01D 35/303* (2013.01); *B01D 61/025* (2013.01); *B01D 61/08* (2013.01);
(Continued)

(58) Field of Classification Search
CPC .... B01D 61/10; B01D 35/303; B01D 61/025; B01D 61/08; B01D 63/065; B01D 63/067;
(Continued)

(56) References Cited

U.S. PATENT DOCUMENTS

| | | | | | |
|---|---|---|---|---|---|
| 4,609,463 | A | * | 9/1986 | Macevicz | B01D 61/08 210/257.2 |
| 4,990,248 | A | * | 2/1991 | Brown | B01D 61/08 210/336 |
| 5,078,876 | A | * | 1/1992 | Whittier | B01D 65/00 210/295 |

FOREIGN PATENT DOCUMENTS

| | | | | | |
|---|---|---|---|---|---|
| CN | 111185102 | A | * | 5/2020 | B01D 63/10 |
| CN | 215479908 | U | * | 1/2022 | |
| WO | WO-2020122642 | A1 | * | 6/2020 | C02F 1/441 |

OTHER PUBLICATIONS

Machine-generated English translation of WO 2020122642, generated on Jan. 23, 2026.*

(Continued)

*Primary Examiner* — Fred Prince

(74) *Attorney, Agent, or Firm* — Bridgeway IP Law Group, PLLC; Jihun Kim

(57) ABSTRACT

A filter module includes: a center tube having at least one purified water inlet on an outer peripheral surface thereof and provided at one end thereof with a connection portion having a purified water outlet formed therein; a reverse osmosis filter wound on the center tube, the reverse osmosis filtering raw water introduced through one end thereof and discharging the filtered raw water to the purified water inlet; and a post-treatment filter disposed inside the center tube and allowing purified water introduced into the center tube to be post-treated by passing through the post-treatment filter, wherein the center tube includes: a first tube member provided at one end thereof with the connection portion and having a first post-treatment filter mounting slot formed therein; and a second tube member detachably connected to the other end of the first tube member and having a second post-treatment filter mounting slot formed therein.

6 Claims, 7 Drawing Sheets

A - A'

(51) Int. Cl.

| | |
|---|---|
| ***B01D 61/02*** | (2006.01) |
| ***B01D 61/08*** | (2006.01) |
| ***B01D 63/06*** | (2006.01) |
| ***B01D 63/10*** | (2006.01) |
| ***C02F 1/28*** | (2023.01) |
| ***C02F 1/44*** | (2023.01) |

(52) U.S. Cl.

CPC ......... *B01D 63/065* (2013.01); *B01D 63/067* (2013.01); *B01D 63/10* (2013.01); *B01D 63/107* (2022.08); *B01D 35/306* (2013.01); *B01D 2311/2626* (2013.01); *B01D 2311/2649* (2013.01); *B01D 2313/10* (2013.01); *B01D 2313/12* (2013.01); *B01D 2313/13* (2013.01); *B01D 2313/146* (2013.01); *B01D 2313/21* (2013.01); *B01D 2313/40* (2013.01); *B01D 2313/90* (2013.01); *C02F 1/281* (2013.01); *C02F 1/283* (2013.01); *C02F 1/441* (2013.01); *C02F 2201/003* (2013.01)

(58) Field of Classification Search

CPC .... B01D 63/10; B01D 63/107; B01D 35/306; B01D 2311/2626; B01D 2311/2649; B01D 2313/10; B01D 2313/12; B01D 2313/13; B01D 2313/146; B01D 2313/21; B01D 2313/40; B01D 2313/90; C02F 1/281; C02F 1/283; C02F 1/441; C02F 2201/003

USPC .......................................... 210/315, 338, 652

See application file for complete search history.

(56) References Cited

OTHER PUBLICATIONS

Machine-generated English translation of CN 215479908, generated on Jan. 23, 2026.*

Machine-generated English translation of CN 111185102, generated on Jan. 23, 2026.*

* cited by examiner

FILTER MODULE HAVING POST-TREATMENT FILTRATION FUNCTION

CROSS-REFERENCE TO RELATED APPLICATIONS

This application claims the priority of Korean Patent Application No. 10-2022-0181934 filed on Dec. 22, 2022, in the Korean Intellectual Property Office, the disclosure of which is incorporated herein by reference.

TECHNICAL FIELD

The present invention relates to a filter module having a post-treatment filtration function and, more particularly, to a filter module that can simultaneously perform purification and post-treatment of raw water.

BACKGROUND

In general, a water purification device refers to a device that filters incoming raw water into purified water to provide drinkable water to users. Such a water purification device employs a combination of several filters to filter raw water. For example, conventional water purification devices include a pretreatment filter, a reverse osmosis filter, and a post-treatment filter.

The pretreatment filter is used to remove suspended solids from raw water, including substances that can degrade the performance of the reverse osmosis filter. After passing through the pretreatment filter, the raw water is filtered by the reverse osmosis filter. The reverse osmosis filter can filter out most dissolved solids in the raw water excluding fine organic matter and some ions. The post-treatment filter is used to remove odors or organic matter from the raw water having passed through the reverse osmosis filter. Typically, an activated carbon filter is used as the post-treatment filter.

These filters are operated in series with each other. However, using the filters in combination can complicate the layout of the interior of a water purification device and can increase the volume of the entire water purification device due to increase in internal volume occupied by the filters.

Therefore, there is a need for a filter module that can solve these problems.

SUMMARY

It is one object of the present invention to provide a filter module having a post-treatment filtration function.

It is another object of the present invention to provide a filter module that can prevent the risk of leakage through minimization of piping connections between filters.

It is a further object of the present invention to provide a filter module that can reduce manufacturing costs.

The present invention is not limited thereto and other objects of the present invention will become apparent to those skilled in the art from the following description in conjunction with the accompanying drawings.

In accordance with one aspect of the present invention, a filter module includes: a center tube having at least one purified water inlet on an outer peripheral surface thereof and provided at one end thereof with a connection portion having a purified water outlet formed therein; a reverse osmosis filter wound on the center tube, filtering raw water introduced through one end thereof, and discharging the filtered raw water to the purified water inlet; and a post-treatment filter disposed inside the center tube and allowing purified water introduced into the center tube to be post-treated by passing through the post-treatment filter, wherein the center tube includes: a first tube member provided at one end thereof with the connection portion and having a first post-treatment filter mounting slot formed therein; and a second tube member detachably connected to the other end of the first tube member and having a second post-treatment filter mounting slot formed therein to communicate with the first post-treatment filter mounting slot, and at least a portion of the post-treatment filter is disposed in the first post-treatment filter mounting slot and the other portion of the post-treatment filter is disposed in the second post-treatment filter mounting slot.

The first tube member may be provided therein with a purified water discharge partition having at least one purified water discharge hole formed therethrough, the second tube member may be provided therein with a separation partition dividing the second tube member into a front space and a rear space, and the post-treatment filter may have a front end facing the purified water discharge partition and a rear end facing the separation partition.

The purified water inlet may communicate with the first post-treatment filter mounting slot and the second post-treatment filter mounting slot, such that purified water supplied through the purified water inlet is introduced into an inner space defined by the purified water discharge partition and the separation partition.

In accordance with another aspect of the present invention, a filter module includes: a center tube having at least one purified water inlet on an outer peripheral surface thereof and formed at one end thereof with a purified water outlet; a reverse osmosis filter wound on the center tube, filtering raw water introduced through one end thereof, and discharging the filtered raw water to the purified water inlet; and a post-treatment filter disposed on the outer peripheral surface of the center tube to cover the purified water inlet and allowing purified water having passed through the reverse osmosis filter to be post-treated by passing through the post-treatment filter, wherein the center tube includes: a cap member provided therein with the purified water outlet and having one end at least partially exposed to an outside of the center tube and detachably coupled to an external filter connection portion; a first tube member formed therethrough with the purified water inlet and having one end detachably coupled to the other end of the cap member and an outer peripheral surface coupled to the post-treatment filter; and a second tube member extending from the other end of the first tube member and having an outer peripheral surface contacting an inner peripheral surface of the reverse osmosis filter.

The second tube member may have a larger diameter than the first tube member such that a stepped portion is formed at a junction between the second tube member and the first tube member to support the post-treatment filter.

The post-treatment filter may have an inner peripheral surface contacting the outer peripheral surface of the first tube member and an outer peripheral surface contacting the inner peripheral surface of the reverse osmosis filter.

An inner space of the first tube member is separated from an inner space of the second tube member and the first tube member may be integrally formed with the second tube member.

The cap member may be provided therein with a stepped stopper contacting a front end of the first tube member to adjust an insertion length of the first tube member into the cap member.

The present invention provides a filter module having a post-treatment filtration function.

The present invention provides a filter module that can prevent the risk of leakage through minimization of piping connections between filters.

The present invention provides a filter module that can reduce manufacturing costs.

The present invention is not limited thereto and other advantages of the present invention will become apparent to those skilled in the art from the following description in conjunction with the accompanying drawings.

DETAILED DESCRIPTION OF EMBODIMENTS

Figure 1:
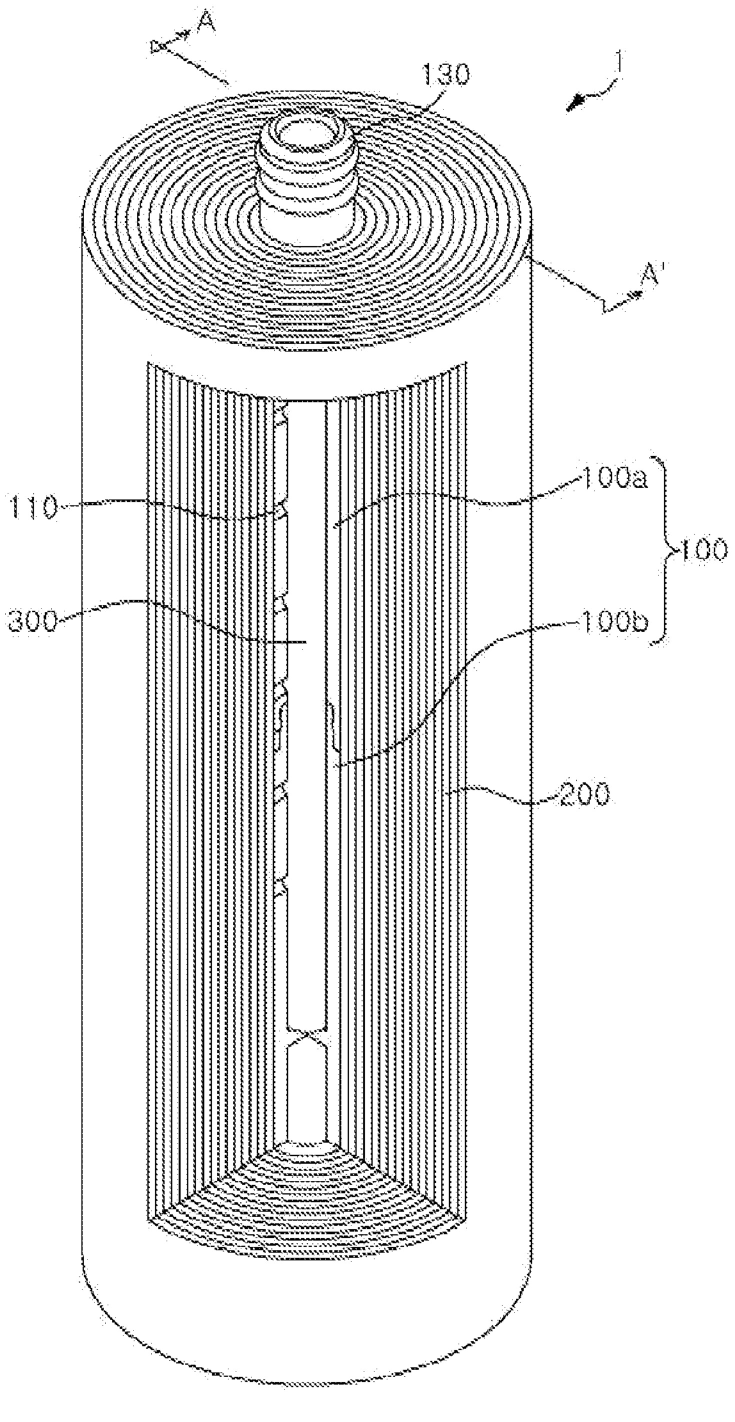
FIG. 1 is a partially cross-sectional perspective view of a filter module according to one embodiment of the present invention.

Hereinafter, exemplary embodiments of the present invention will be described with reference to the accompanying drawings.

Description of known functions and constructions which may unnecessarily obscure the subject matter of the present invention will be omitted.

It will be understood that, when an element is referred to as being "connected to", "supported on", or "brought into contact with" another element, it can be directly connected to, supported on, or brought into contact with the other element, or intervening layer(s) may also be present.

The terminology used herein is for the purpose of describing embodiments only and is not intended to limit the invention. As used herein, the singular forms "a", "an", and "the" are intended to include the plural forms as well, unless the context clearly indicates otherwise.

As used herein, terms such as "upper" and "lower" are defined with reference to the accompanying drawings. Thus, it will be understood that the term "upper side" can be used interchangeably with the term "lower side". In the drawings, some elements are exaggerated, omitted, or schematically depicted and each element is not necessarily drawn to scale for descriptive convenience and clarity.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

Figure 2:
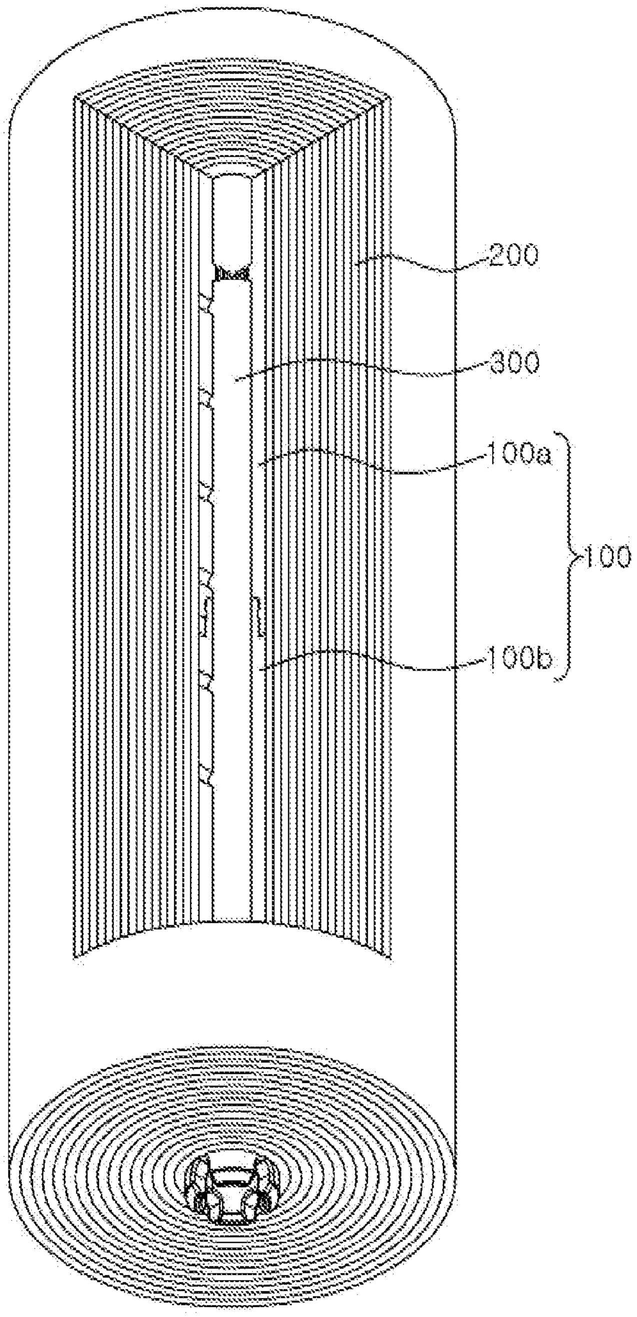
FIG. 2 is a partially cross-sectional perspective view of the filter module according to the one embodiment viewed at a different angle.
Figure 3:
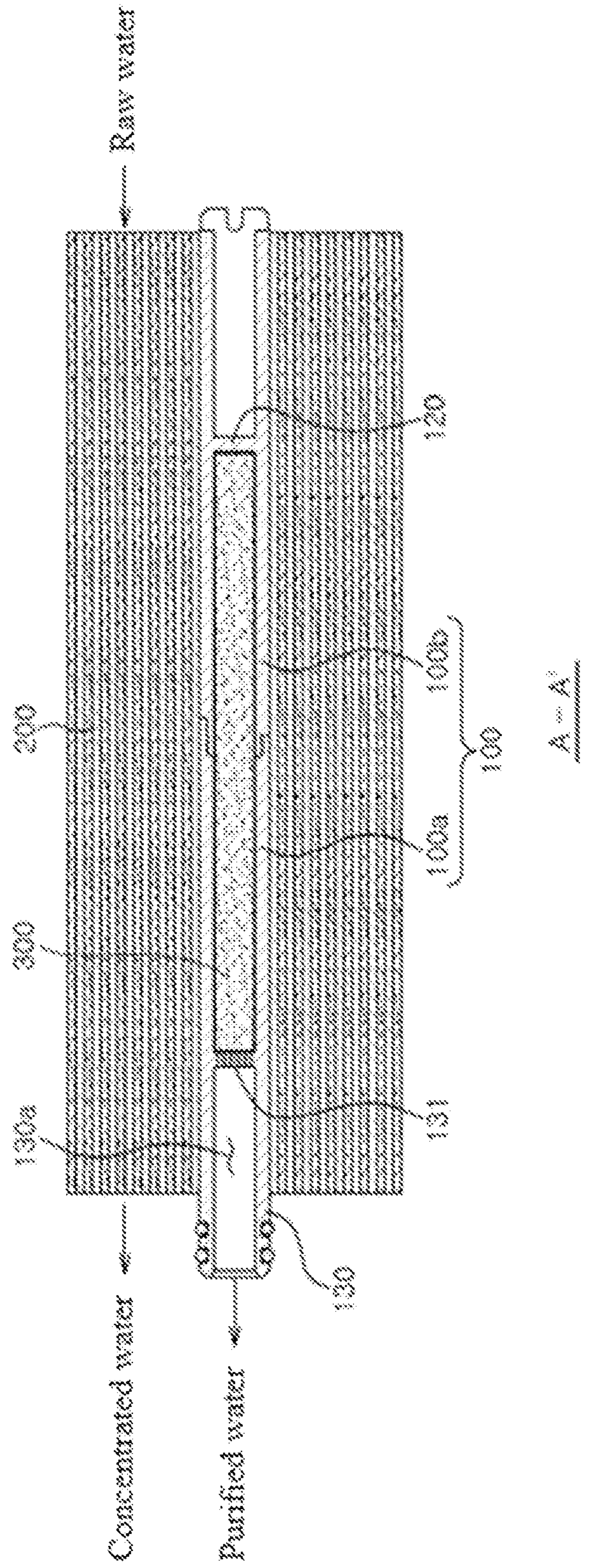
FIG. 3 is a schematic cross-sectional view taken along A-A' of FIG. 1.

FIG. 1 is a partially cross-sectional perspective view of a filter module according to one embodiment of the present invention, FIG. 2 is a partially cross-sectional perspective view of the filter module according to this embodiment viewed at a different angle, and FIG. 3 is a schematic cross-sectional view taken along A-A' of FIG. 1.

Referring to FIG. 1 to FIG. 3, the filter module 1 according to this embodiment may include: a center tube 100 having at least one purified water inlet 110 on an outer peripheral surface thereof and provided at one end thereof with a connection portion 130 having a purified water outlet 130*a* formed therein; a reverse osmosis filter 200 wound on the center tube 100, filtering raw water introduced through one end thereof and discharging the filtered raw water to the purified water inlet 110; and a post-treatment filter 300 disposed inside the center tube 100 and allowing purified water introduced into the center tube 100 to be post-treated by passing through the post-treatment filter 300.

In the following, a water purification process using the filter module 1 according to this embodiment is briefly described. Raw water may be introduced into the reverse osmosis filter 200 through a rear end thereof. The raw water introduced into the reverse osmosis filter 200 may be filtered through a reverse osmosis membrane of the reverse osmosis filter 200 to become purified water. The purified water may be introduced into the center tube 100 through the purified water inlet 110 of the center tube 100. Then, the purified water may be post-treated by passing through the post-treatment filter 300 disposed inside the center tube 100. Herein, "post-treatment" may refer to removal of organic matter, heavy metals, bacteria, and/or odors that are not filtered out by the reverse osmosis filter 200.

The purified water having passed through the post-treatment filter 300 may finally be discharged to the purified water outlet 130*a*. A fraction of the raw water, which contains organic/inorganic components filtered out by the reverse osmosis membrane of the reverse osmosis filter 200, may be discharged as concentrated water from the reverse osmosis filter 200 through a front end thereof. As used herein to indicate directions, the term "front end" may refer to an end through which the concentrated water is discharged from the reverse osmosis filter 200 and the term "rear end" may refer to an end through which raw water is introduced into the reverse osmosis filter 200, with reference to FIG. 3.

Figure 4:
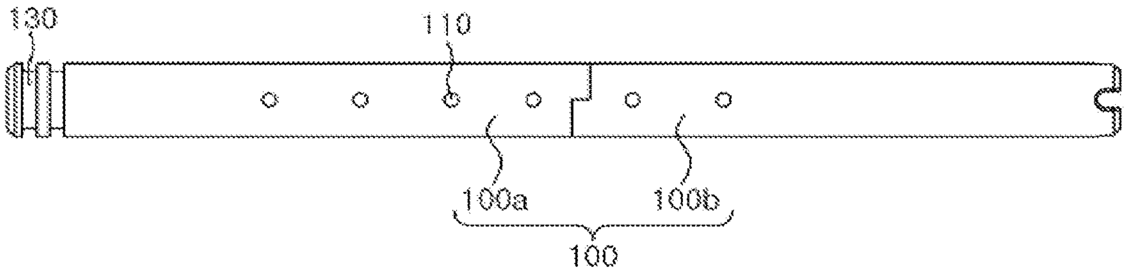
FIG. 4 is a schematic side view of a center tube of the filter module according to one embodiment of the present invention.
Figure 5:
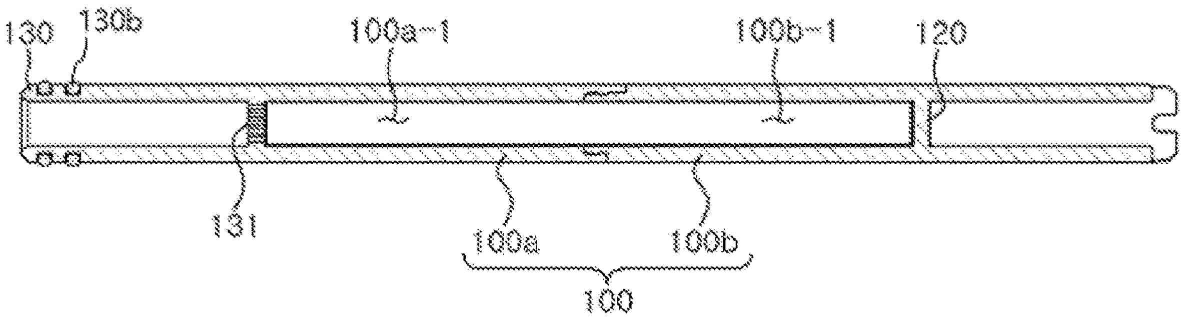
FIG. 5 is a schematic cross-sectional view of the center tube of FIG. 4.

Referring to FIG. 4 and FIG. 5, the center tube 100 may be disposed inside the filter module 1. The center tube 100 may be formed of a metal or resin. However, it will be understood that the present invention is not limited thereto and the center tube 100 may be formed of various other materials known in the art. For example, the center tube 100 may have a shape of a cylinder open at one end thereof.

The center tube 100 may include: a first tube member 100*a* provided at one end thereof with the connection portion 130 and having a first post-treatment filter mounting slot 110*a*-1 formed therein; and a second tube member 110*b* detachably connected to the other end of the first tube member 100*a* and having a second post-treatment filter mounting slot 100*b*-1 formed therein.

The first tube member 100*a* may have a shape of a cylinder open at both ends thereof. The first tube member 100*a* may be provided therein with a purified water discharge partition 131 having at least one purified water-discharge hole formed therethrough. With respect to the purified water discharge partition 131, an interior space of the first tube member 100*a* may be divided into a front space and a rear space. A front end of the first tube member 100*a* may define the connection portion 130 having the purified water outlet 130*a* formed therein. The connection portion 130 may be integrally formed with the first tube member 100*a*. The connection portion 130 may be connected to an external filter connection portion (not shown) on which the filter module 1 is installed. Post-treated purified water may be supplied to the external filter connection portion through the purified water outlet 130*a* of the connection portion 130. The connection portion 130 may be provided with at least one leak-proof member 130*b* on an outer peripheral surface thereof to provide a tight seal between the connection portion 130 and the external filter connection portion. The leak-proof member 130*b* may include, for example, a rubber O-ring.

With respect to the purified water discharge partition 131, the rear space of the first tube member 100*a* may define the first post-treatment filter mounting slot 100*a*-1. The first tube member 100*a* may have the purified water inlet 110 formed therethrough. The purified water inlet 110 formed through the first tube member 100*a* may communicate with the first post-treatment filter mounting slot 100*a*-1.

The second tube member 100*b* may be detachably coupled to the rear end of the first tube member 100*a*. By way of example, the front end of the second tube member 100*b* may be detachably inserted into and coupled to the rear end of the first tube member 100*a*. The first tube member 100*a* may have a rear inner peripheral surface formed with a groove having a shape conforming to a front outer peripheral surface of the second tube member 100*b*. The second tube member 100*b* may be provided therein with a separation partition 120. With respect to the separation partition 120, an interior space of the second tube member 100*b* may be divided into a front space and a rear space. The front space of the second tube member with respect to the separation partition 120 may define the second post-treatment filter mounting slot 100*b*-1. The second tube member 100*b* may have the purified water inlet 110 formed therethrough. The purified water inlet 110 formed through the second tube member 100*b* may communicate with the second post-treatment filter mounting slot 100*b*-1.

There is no particular restriction on the number of purified water inlets 110 formed through the first tube member 100*a* and the second tube member 100*b*. One or more, for example, 2 to 100, purified water inlets are formed through the first tube member 100*a* and the second tube member 100*b*, without being limited thereto.

There is no particular restriction on the shape of the purified water inlet 110 formed through the first tube member 100*a* and the second tube member 100*b*. For example, the purified water inlet 110 may have a circular cross-section, an elliptical cross-section, or a polygonal cross-section, including triangular, rectangular, irregular polygonal cross-sections, and the like.

When the first tube member 100*a* is coupled to the second tube member 100*b*, the first post-treatment filter mounting slot 100*a*-1 may communicate with the second post-treatment filter mounting slot 100*b*-1.

The post-treatment filter 300 may be disposed inside the center tube 100. For example, the post-treatment filter 300 may be disposed in a space defined by the first post-treatment filter mounting slot 100*a*-1 and the second post-treatment filter mounting slot 100*b*-1. The post-treatment filter 300 may have a front end facing the purified water discharge partition 131 and a rear end facing the separation partition 120. The post-treatment filter 300 may include a carbon filter or various mineral filters. By way of example, the post-treatment filter 300 may be composed of a carbon filter including activated carbon. By way of another example, the post-treatment filter 300 may be composed of a mineral filter, such as illite or zeolite, although there is no particular restriction on the composition of the post-treatment filter 300. The reverse osmosis filter 200 may be wound on an outer peripheral surface of the center tube 100. For example, the reverse osmosis filter 200 may be wound onto the outer peripheral surface of the center tube 100 by securing the center tube 100 having the post-treatment filter 300 coupled thereto to a separate winding device, followed by rotating the center tube 100.

The reverse osmosis filter 200 may include multiple layers. Raw water may be primarily filtered through the reverse osmosis filter 200. The filtered raw water, that is, purified water, may be introduced into the center tube 100 through the purified water inlet 110 of the center tube 100. The purified water introduced into the center tube 100 may be post-treated by passing through the post-treatment filter 300 and may be supplied to the external filter connection portion by passing through the purified water discharge hole and the purified water outlet 130*a* in the stated order.

As described above, since the filter module 1 according to this embodiment includes the post-treatment filter 300 disposed inside the center tube 100, the filter module 1 can perform post-treatment of purified water without a separate post-treatment filter. In addition, the filter module 1 can ensure easy replacement of the post-treatment filter 300 through disassembly/assembly of the center tube 100. Further, since there is no need to connect a separate post-treatment filter to the filter module 1, the filter module 1 can prevent the risk of leakage through minimization of piping connections between filters.

Figure 6:
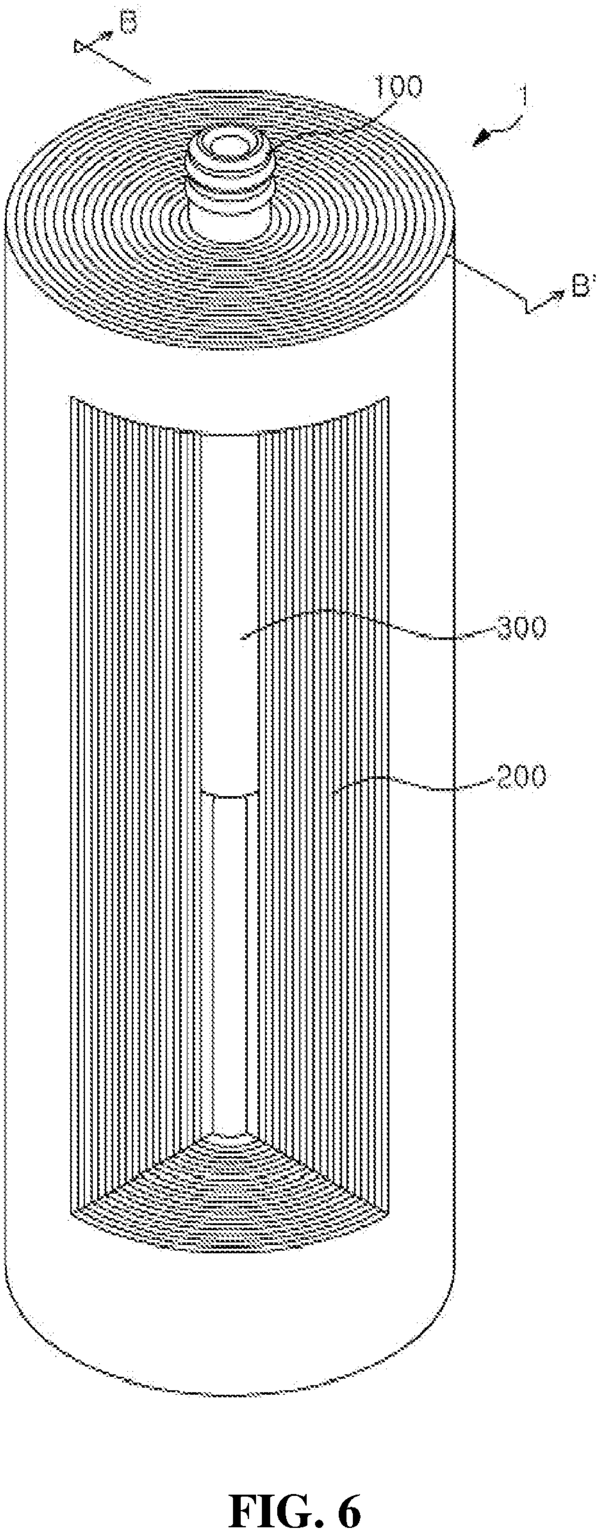
FIG. 6 is a partially cross-sectional perspective view of a filter module according to another embodiment of the present invention.
Figure 7:
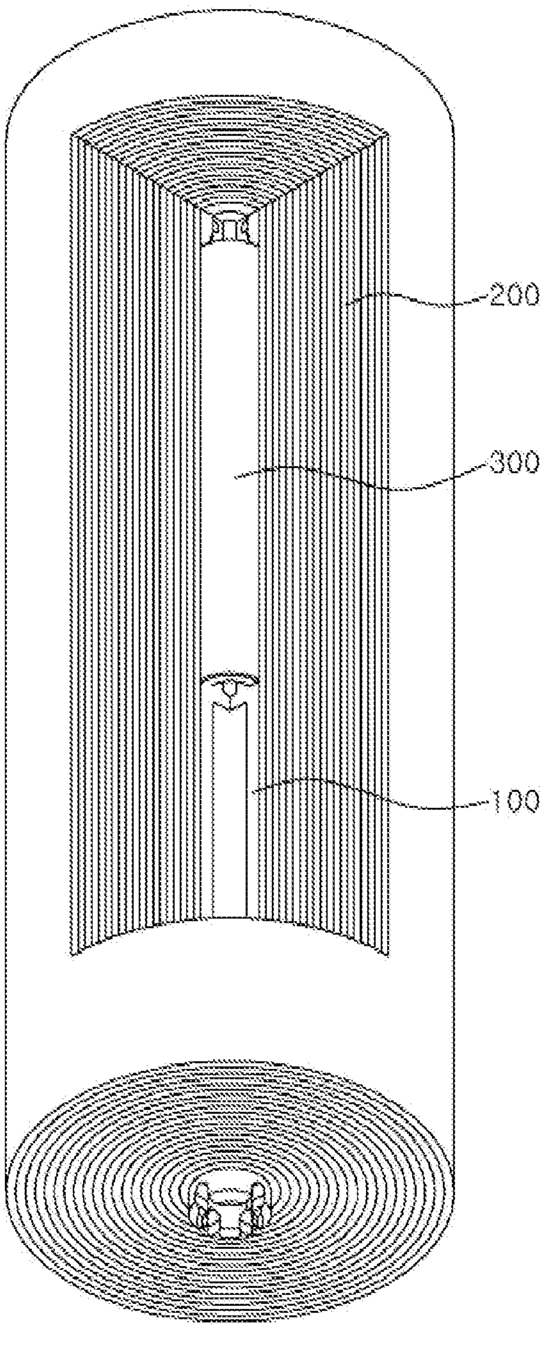
FIG. 7 is a partially cross-sectional perspective view of the filter module according to the other embodiment viewed at a different angle.
Figure 8:
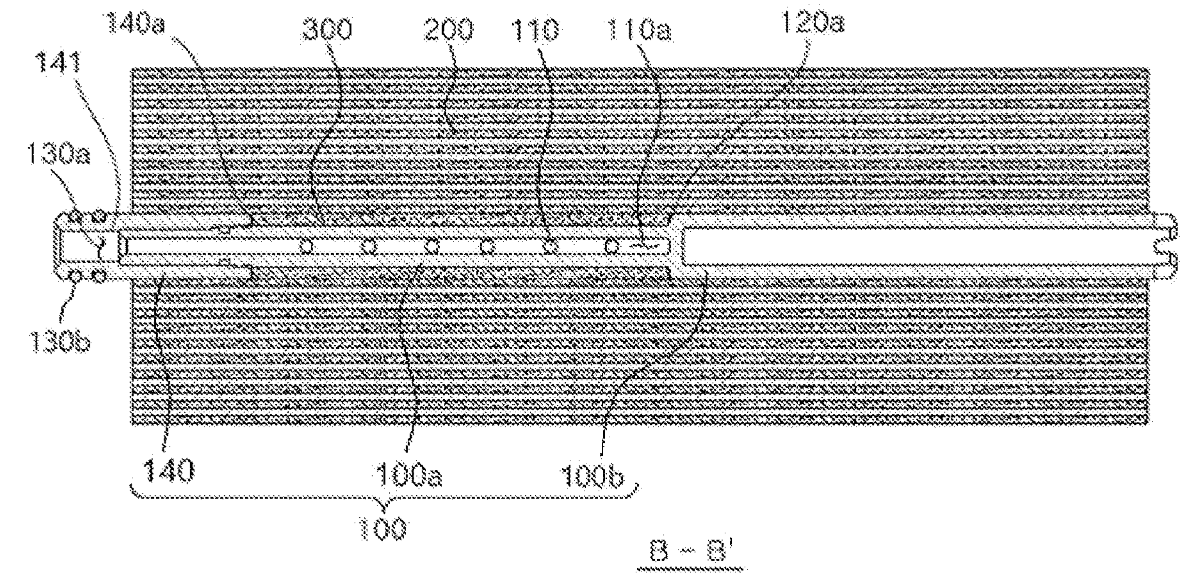
FIG. 8 is a schematic cross-sectional view taken along B-B' of FIG. 6.
Figure 9:
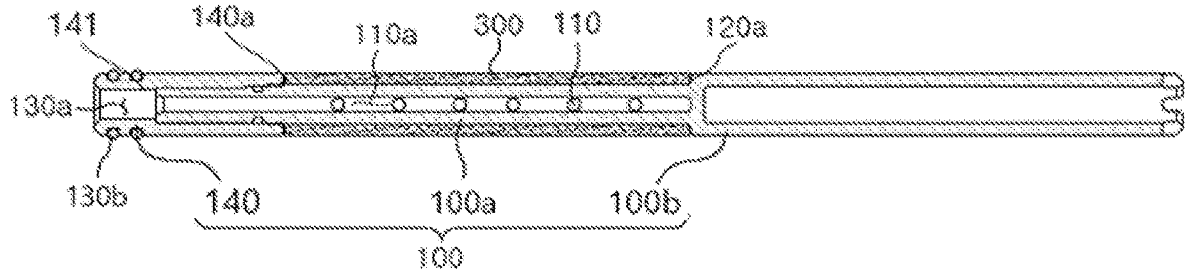
FIG. 9 is a schematic cross-sectional view illustrating coupling between a center tube and a post-treatment filter of the filter module according to the other embodiment.

Next, a filter module 1 according to another embodiment of the present invention will be described with reference to FIG. 6 to FIG. 9. FIG. 6 is a partially cross-sectional perspective view of the filter module according to this embodiment, FIG. 7 is a partially cross-sectional perspective view of the filter module according to this embodiment viewed at a different angle, FIG. 8 is a schematic cross-sectional view taken along B-B' of FIG. 6, and FIG. 9 is a schematic cross-sectional view illustrating coupling between a center tube and a post-treatment filter of the filter module according to this embodiment.

Referring to FIG. 6 to FIG. 9, the filter module 1 may include: a center tube 100 having at least one purified water inlet 110 on an outer peripheral surface thereof and formed at one end thereof with a purified water outlet 130*a*; a reverse osmosis filter 200 wound on the center tube 100, filtering raw water introduced through one end thereof and discharging the filtered raw water to the purified water inlet 110; and a post-treatment filter 300 disposed on the outer peripheral surface of the center tube 100 to cover the purified water inlet 110 and allowing purified water having passed through the reverse osmosis filter 200 to be post-treated by passing through the post-treatment filter 300.

In the following, a water purification process using the filter module 1 according to this embodiment is briefly described. Raw water may be introduced into the reverse osmosis filter 200 through a rear end thereof. The raw water introduced into the reverse osmosis filter 200 may be filtered through a reverse osmosis membrane of the reverse osmosis filter 200 to become purified water. Then, the purified water may be post-treated by passing through the post-treatment filter 300 disposed on the outer peripheral surface of the center tube 100. As used herein, post-treatment may refer to removal of organic matter, heavy metals, bacteria, and/or odors which are not filtered out by the reverse osmosis filter 200. The post-treated purified water may be introduced into the center tube 100 through the purified water inlet 110. The purified water introduced into the center tube 100 may be moved to the purified water outlet 130*a* along a purified water discharge passage 110*a* to be discharged from the center tube 100. A fraction of the raw water, which contains organic/inorganic components filtered out by the reverse osmosis membrane of the reverse osmosis filter 200, may be discharged as concentrated water from the reverse osmosis filter 200 through a front end of the reverse osmosis filter 200.

The center tube 100 may be disposed inside the filter module 1. The center tube 100 may be formed of a metal or a resin. However, it will be understood that present invention is not limited thereto and the center tube 100 may be formed of various other materials known in the art.

The center tube 100 may include: a cap member 140 provided therein with the purified water outlet 130*a* and having one end at least partially exposed to an outside of the center tube 100 and detachably coupled to an external filter connection portion; a first tube member 100*a* formed therethrough with the purified water inlet 110 and having one end detachably coupled to the other end of the cap member 140 and an outer peripheral surface coupled to the post-treatment filter 300; and a second tube member 100*b* extending from the other end of the first tube member 100*a* and having an outer peripheral surface contacting an inner peripheral surface of the reverse osmosis filter 200.

The number of purified water inlets 110 formed through the first tube member 100*a* is not particularly limited. One or more, for example, 2 to 100, purified water inlets may be formed through the first tube member 100*a*, without being limited thereto.

Although the shape of the purified water inlet 110 formed through the first tube member 100*a* is not particularly limited, the purified water inlet 110 may have, for example, a circular cross-section, an elliptical cross-section, or a polygonal cross-section, including triangular, rectangular, irregular polygonal cross-sections, and the like.

At least a portion of the one end of the cap member 140 may be exposed to an outside the center tube 100. The cap member 140 may be detachably inserted into and coupled to the external filter connection portion. The cap member 140 may be provided with at least one leak-proof member 140*b* on an outer peripheral surface thereof to provide a tight seal between the cap member 140 and the external filter connection portion. The purified water outlet 130*a* may be formed inside the cap member 130. The purified water outlet 130*a* may communicate with the purified water discharge passage 110*a*. Purified water supplied through the purified water discharge passage 110*a* may be supplied to the external filter connection portion through the purified water outlet 130*a*.

The first tube member 100*a* may be detachably inserted into and coupled to the cap member 140. As the first tube member 100*a* is inserted into the cap member 140, a rear end 140*a* of the cap member 140 may be disposed on the outer peripheral surface of the first tube member 100*a*. The rear end 140*a* of the cap member 140 may support a front end of the post-treatment filter 300.

The first tube member 100*a* may be formed therein with the purified water discharge passage 110*a*. The first tube member 100*a* may include the purified water inlet 110 formed through the outer peripheral surface thereof. The purified water inlet 110 may communicate with the purified water discharge passage 110*a*. The first tube member 100*a* may have a front end inserted into the cap member 140, and the cap member 140 may be provided therein with a stepped stopper 141 contacting the front end of the first tube member 100*a* to adjust an insertion length of the first tube member 100*a* into the cap member 140. The stepped stopper 141 may protrude a predetermined length from the inner circumferential surface of the cap member 140 in a radially inward direction of the cap member 140.

The second tube member 100*b* may extend from the rear end of the first tube member 100*a* in a longitudinal direction of the filter module. The second tube member 100*b* may be separately fabricated from the first tube member 100*a* to be coupled to the first tube member 100*a*, or may be integrally formed with the first tube member 100*a*. The second tube member 100*b* may have a larger diameter than the first tube member 100*a*. Accordingly, a stepped portion 120*a* may be formed at a junction between the second tube member 100*b* and the first tube member 100*a*. The stepped portion 120*a* may support the post-treatment filter 300.

The post-treatment filter 300 may be disposed on the outer peripheral surface of the center tube 100. For example, the post-treatment filter 300 may have a hollow cylindrical shape, such that the first tube member 100*a* is inserted into the post-treatment filter 300 with the inner circumferential surface of the post-treatment filter 300 contacting at least a portion of the outer peripheral surface of the first tube member 100*a*. A separate adhesive or bonding agent may optionally be interposed between the inner circumferential surface of the post-treatment filter 300 and the outer peripheral surface of the first tube member 100*a* to improve adhesion of the post-treatment filter 300 to the first tube member 100*a*. The post-treatment filter 300 may include a carbon filter or various mineral filters. By way of example, the post-treatment filter 300 may be composed of a carbon filter including activated carbon, or may be composed of a mineral filter such as illite or zeolite, although there is no particular restriction on the composition of the post-treatment filter 300.

The post-treatment filter 300 may cover the purified water inlet 110. The inner peripheral surface of the post-treatment filter 300 may contact the outer peripheral surface of the first tube member 100*a* and the outer peripheral surface of the post-treatment filter 300 may contact the inner peripheral surface of the reverse osmosis filter 200. Accordingly, purified water having passed through the reverse osmosis filter 200 may be introduced into the post-treatment filter 300 and purified water having passed through the post-treatment filter 300 may be introduced into the first tube member 100*a* through the purified water inlet 110.

The front end of the post-treatment filter 300 may be supported on the rear end 140*a* of the cap member 140 and the rear end of the post-treatment filter 300 may be supported on the stepped portion 120*a*.

The reverse osmosis filter 200 may be wound on the outer peripheral surface of the center tube 100. For example, the reverse osmosis filter 200 may be wound onto the outer peripheral surface of the center tube 100 by securing the center tube 100 having the post-treatment filter 300 coupled thereto to a separate winding device, followed by rotating the center tube 100. Accordingly, the inner peripheral surface of the reverse osmosis filter 200 may contact the outer peripheral surface of the cap member 130, the outer peripheral surface of the post-treatment filter 300, and the outer peripheral surface of the second tube member 120.

The reverse osmosis filter 200 may include multiple layers. Raw water may be primarily filtered through the reverse osmosis filter 200. The filtered raw water, that is, purified water, may be introduced into the post-treatment filter 300 through the outer peripheral surface thereof and may be discharged from the post-treatment filter 300 through the inner peripheral surface thereof. The purified water may be post-treated by passing through the post-treatment filter 300. The post-treated purified water may be introduced into the center tube 100 through the purified water inlet 111 contacting the inner peripheral surface of the post-treatment filter 300. The purified water introduced into the center tube 100 may be supplied to the external filter connection portion by passing through the purified water discharge passage 110*a* and the purified water outlet 130*a* in the stated order.

As described above, since the filter module 1 according to this embodiment includes the post-treatment filter 300 disposed outside the center tube 100, the filter module 1 can perform post-treatment of purified water without a separate post-treatment filter. In addition, since the post-treatment filter 300 is detachably coupled to the center tube 100, the filter module 1 ensures easy replacement of the post-treatment filter 300. Further, since there is no need to connect a separate post-treatment filter to the filter module 1, the filter module 1 can prevent the risk of leakage through minimization of piping connections between filters.

Although some embodiments have been described herein, it will be understood that these embodiments are provided for illustration only and are not to be construed in any way as limiting the present invention and that the present invention be construed as having the broadest possible scope in accordance with the basic ideas disclosed herein. In addition, it should be understood that the disclosed embodiments can be combined/substituted by those skilled in the art to create patterns of features not clearly defined herein without departing from the spirit and scope of the invention. Further, it should be understood that various modifications, variations, and alterations can be made by those skilled in the art without departing from the spirit and scope of the present invention.

<List of Reference numerals>

| | |
|---|---|
| 1: Filter module | 100: Center tube |
| 100a: First tube member | 100a-1: First post-treatment filter mounting slot |
| 100b: Second tube member | 100b-1: Second post-treatment filter mounting slot |
| 110: Purified water inlet | 110a: Purified water discharge passage |
| 120: Separation partition | 120a: Stepped portion |
| 130: Connection portion | 130a: Purified water outlet |
| 130b: Leak-proof member | 131: Purified water discharge partition |
| 140: Cap member | 140a: Rear end of cap member |
| 141: Stepped stopper | 200: Reverse osmosis filter |
| 300: Post-treatment filter | |

The invention claimed is:

1. A filter module, comprising:

a center tube having at least one purified water inlet on an outer peripheral surface thereof and provided at one end thereof with a connection portion having a purified water outlet defined therein;

a reverse osmosis filter wound on the center tube, the reverse osmosis filter filtering raw water introduced through one end thereof and discharging the filtered raw water to the at least one purified water inlet; and a post-treatment filter disposed inside the center tube and allowing purified water introduced into the center tube to be post-treated by passing through the post-treatment filter, wherein the center tube comprises:

a first tube member having the connection portion at one end thereof and having a first post-treatment filter mounting slot defined therein; and a second tube member detachably connected to another end of the first tube member and having a second post-treatment filter mounting slot defined therein to communicate with the first post-treatment filter mounting slot, wherein at least a portion of the post-treatment filter is disposed in the first post-treatment filter mounting slot, and another portion of the post-treatment filter is disposed in the second post-treatment filter mounting slot, wherein the first tube member is disposed therein with a purified water discharge partition having at least one purified water discharge hole defined therethrough, the second tube member is disposed therein with a separation partition dividing the second tube member into a front space and a rear space, and the post-treatment filter has a front end facing the purified water discharge partition and a rear end facing the separation partition.

2. The filter module according to claim 1, wherein the at least one purified water inlet communicates with the first post-treatment filter mounting slot and the second post-treatment filter mounting slot such that the purified water supplied through the at least one purified water inlet is introduced into an inner space defined by the purified water discharge partition and the separation partition.

3. A filter module, comprising:

a center tube having at least one purified water inlet on an outer peripheral surface thereof and defined at one end thereof with a purified water outlet;

a reverse osmosis filter wound on the center tube, the reverse osmosis filter filtering raw water introduced through one end thereof and discharging the filtered raw water to the at least one purified water inlet; and a post-treatment filter disposed on the outer peripheral surface of the center tube to cover the at least one purified water inlet and allowing purified water having passed through the reverse osmosis filter to be post-treated by passing through the post-treatment filter, wherein the center tube comprises:

a cap member disposed therein with the purified water outlet and having one end at least partially exposed to an outside of the center tube and detachably coupled to an external filter connection portion;

a first tube member defined therethrough with the at least one purified water inlet and having one end detachably coupled to another end of the cap member and an outer peripheral surface coupled to the post-treatment filter; and a second tube member extending from another end of the first tube member and having an outer peripheral surface contacting an inner peripheral surface of the reverse osmosis filter, and wherein the cap member is disposed therein with a stepped stopper contacting a front end of the first tube member to adjust an insertion length of the first tube member into the cap member.

4. The filter module according to claim 3, wherein the second tube member has a larger diameter than the first tube member such that a stepped portion is defined at a junction between the second tube member and the first tube member to support the post-treatment filter.

5. The filter module according to claim 3, wherein the post-treatment filter has an inner peripheral surface contacting the outer peripheral surface of the first tube member and an outer peripheral surface contacting the inner peripheral surface of the reverse osmosis filter.

6. The filter module according to claim 3, wherein an inner space of the first tube member is separated from an inner space of the second tube member, and the first tube member is integrally formed with the second tube member.

* * * * *